(12) United States Patent
Lin

(10) Patent No.: US 12,554,556 B2
(45) Date of Patent: Feb. 17, 2026

(54) RESOURCE ELIMINATION METHOD, APPARATUS, ELECTRONIC DEVICE AND READABLE STORAGE MEDIUM

(71) Applicant: BEIJING BAIDU NETCOM SCIENCE TECHNOLOGY CO., LTD., Beijing (CN)

(72) Inventor: Yao Lin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 18/748,075

(22) Filed: Jun. 19, 2024

(65) Prior Publication Data

US 2024/0411616 A1 Dec. 12, 2024

(30) Foreign Application Priority Data

Dec. 6, 2023 (CN) .......................... 202311662762.3

(51) Int. Cl.
*G06F 9/50* (2006.01)
*G06F 12/123* (2016.01)
*G06F 12/126* (2016.01)

(52) U.S. Cl.
CPC .......... *G06F 9/5094* (2013.01); *G06F 9/5016* (2013.01); *G06F 2209/5022* (2013.01)

(58) Field of Classification Search
CPC ................ G06F 9/5094; G06F 9/5016; G06F 2209/5022
USPC ........................................................ 711/154
See application file for complete search history.

(56) References Cited

U.S. PATENT DOCUMENTS

| 2014/0052814 A1* | 2/2014 | Graham .................. H04L 67/51 709/217 |
| 2014/0180817 A1* | 6/2014 | Zilkha ............... G06F 16/24575 705/14.55 |
| 2016/0132540 A1* | 5/2016 | Balasa Ramnath .......................... G06F 16/2282 707/741 |
| 2021/0117121 A1* | 4/2021 | Chen ....................... G06F 3/061 |
| 2022/0197537 A1* | 6/2022 | Basu ..................... G06F 3/0655 |
| 2024/0012756 A1* | 1/2024 | Xiang ................. G06F 12/0811 |

* cited by examiner

*Primary Examiner* — Arpan P. Savla
*Assistant Examiner* — Sidney Li
(74) *Attorney, Agent, or Firm* — Kwan & Olynick LLP

(57) ABSTRACT

A resource eviction method, an electronic device and a readable storage medium, which relate to the field of artificial intelligence technologies, such as cloud service technologies, big data technologies, or the like, are disclosed. The resource eviction method includes: acquiring an access day number of at least one target resource in a current cache period, and acquiring an access frequency of the at least one target resource according to the access day number and a preset time interval; acquiring a time heat factor corresponding to the current cache period, and acquiring resource heat of the at least one target resource according to the access frequency and the time heat factor; acquiring target heat according to the time heat factor; and evicting the target resource with the resource heat smaller than or equal to the target heat, updating the time heat factor according to a preset update value, and taking the updated time heat factor as a time heat factor corresponding to a next cache period.

20 Claims, 3 Drawing Sheets

RESOURCE ELIMINATION METHOD, APPARATUS, ELECTRONIC DEVICE AND READABLE STORAGE MEDIUM

CROSS-REFERENCE TO RELATED APPLICATIONS

The present disclosure claims priority and benefit of Chinese Patent Application No. 202311662762.3, entitled "Resource Elimination Method, Apparatus, Electronic Device and Readable Storage Medium", filed on Dec. 6, 2023, which is incorporated herein by reference in its entirety.

TECHNICAL FIELD

The present disclosure relates to the field of computer technologies, and particularly to the field of artificial intelligence technologies, such as big data technologies, cloud service technologies, or the like, and provides a resource elimination method, an apparatus, an electronic device and a readable storage medium.

BACKGROUND

In the prior art, a cache elimination/eviction algorithm based on a greedy dual size frequency (GDSF) is usually used to compute resource heat of resources located in a storage machine. For resources located in a small disk, accurate resource heat can be obtained using the cache eviction algorithm; but for resources located in a large disk, the resource heat acquired using the cache eviction algorithm has low accuracy; under the condition of the low accuracy of the computed resource heat, resource eviction accuracy can be reduced.

SUMMARY

According to a first aspect of the present disclosure, there is provided a resource eviction method, including: acquiring an access day number of at least one target resource in a current cache period, and acquiring an access frequency of the at least one target resource according to the access day number and a preset time interval; acquiring a time heat factor corresponding to the current cache period, and acquiring resource heat of the at least one target resource according to the access frequency and the time heat factor; acquiring target heat according to the time heat factor; and evicting the target resource with the resource heat smaller than or equal to the target heat, updating the time heat factor according to a preset update value, and taking the updated time heat factor as a time heat factor corresponding to a next cache period.

According to a second aspect of the present disclosure, there is provided an electronic device, including: at least one processor; and a memory connected with the at least one processor communicatively, wherein the memory stores instructions executable by the at least one processor to enable the at least one processor to perform the method as mentioned above.

According to a third aspect of the present disclosure, there is provided a non-transitory computer readable storage medium with computer instructions stored thereon, wherein the computer instructions are used for causing a computer to perform the method as mentioned above.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Figure 1:
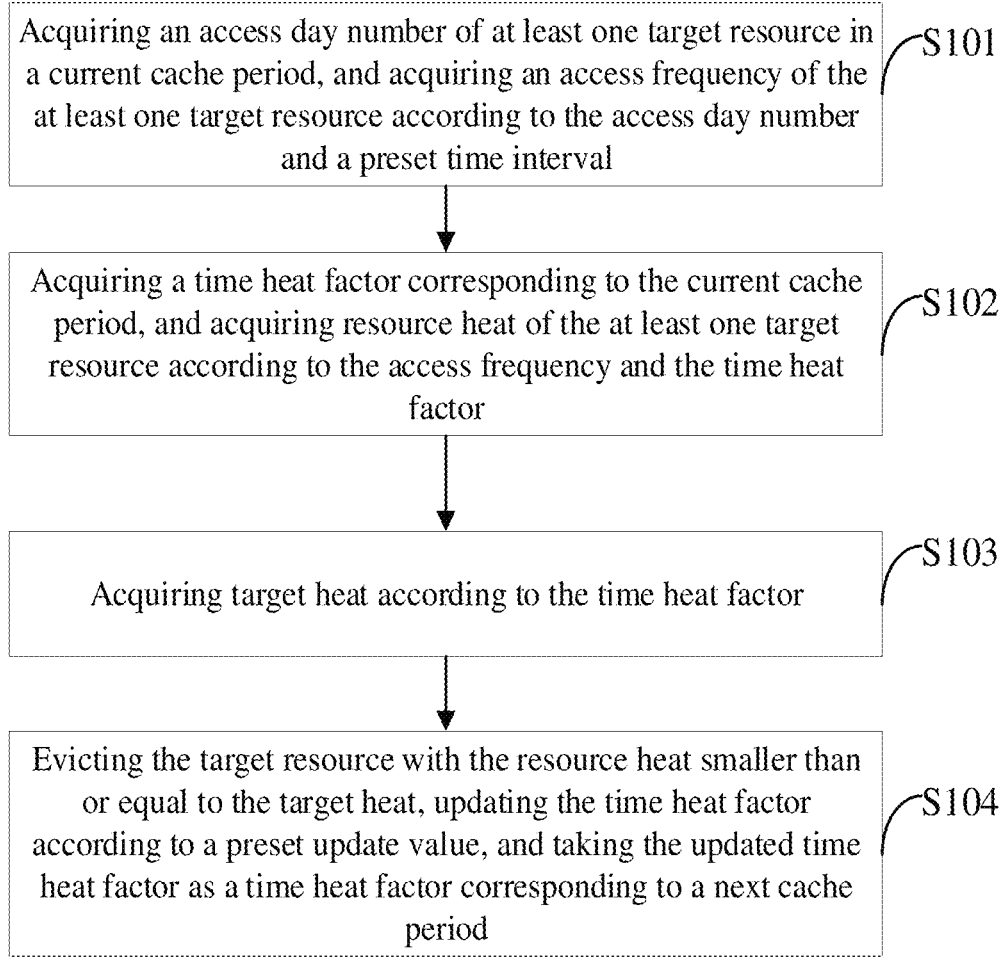
FIG. 1 is a schematic diagram according to a first embodiment of the present disclosure.

FIG. 1 is a schematic diagram according to a first embodiment of the present disclosure. As shown in FIG. 1, a resource eviction method according to the embodiment includes the following steps:

S101: acquiring an access day number of at least one target resource in a current cache period, and acquiring an access frequency of the at least one target resource according to the access day number and a preset time interval;

S102: acquiring a time heat factor corresponding to the current cache period, and acquiring resource heat of the at least one target resource according to the access frequency and the time heat factor;

S103: acquiring target heat according to the time heat factor; and

S104: evicting the target resource with the resource heat smaller than or equal to the target heat, updating the time heat factor according to a preset update value, and taking the updated time heat factor as a time heat factor corresponding to a next cache period.

In the resource eviction method according to the embodiment, on the one hand, the access frequency of the target resource is acquired according to the access day number and the preset time interval, which can avoid the problem of inaccurate calculation of the resource heat caused by taking an access time number of the target resource as the access frequency in the prior art, such that both the time heat factor and the access frequency can reflect importance in a calculation process of the resource heat, thereby improving accuracy of the acquired resource heat; on the other hand, the time heat factor is updated according to the preset update value, which can avoid the problem of too fast update of the time heat factor caused by taking maximum heat of an evicted resource as the updated time heat factor in the prior art, thereby improving the resource eviction accuracy; when the target resources are evicted in the embodiment, the plural target resources are not required to be sequenced according to the resource heat, thus effectively saving CPU resources; in addition, in the embodiment, the resource eviction method according to the embodiment is more suitable for resource eviction of storage machines with large disks by optimizing an acquisition way of the time heat factor and the access frequency.

In the embodiment, the target resource is stored in the storage machine, different storage machines correspond to different cache periods (for example, 10 days, 30 days, or the like), and when the cache period is reached (for example, when 10 days or 30 days are reached), the resources stored in the storage machine are evicted; in the embodiment, during the execution of the S101, the cache period can be determined according to the storage machine where the target resource is located.

In the embodiment, when the S101 is executed, the current cache period may be first obtained according to the storage machine where the target resource is located, and then, days in the current cache period when the target resource is accessed are counted, and finally, the access day number is obtained according to the counting result.

For example, if the current cache period is 10 days, and the target resource is accessed on the 1st day, the 2nd day, the 5th day and the 8th day in the 10 days, in the embodiment, when the S101 is executed, 4 may be taken as the access day number of the target resource in the current cache period.

In the embodiment, after the S101 is executed to acquire the access day number of the target resource, the access frequency of the target resource is acquired according to the acquired access day number and the preset time interval; specifically, in the embodiment, a division result between the access day number and the preset time interval is taken as the access frequency of the target resource.

For example, if the current cache period is 30 days, the preset time interval is 5 days, and the access day number of the target resource in the current eviction period is 20, in the embodiment, 4 obtained by (20÷5) is taken as the access frequency of the target resource; it can be understood that, if the division result between the access day number and the preset time interval is less than 1 during the execution of the S101 in the embodiment, the access frequency of the target resource is set to 0.

That is, in the embodiment, multiple times of access to the target resource within the same day are set to 1 time, and then, the access frequency is obtained according to the access day number of the target resource within the current cache period, such that on the one hand, the problem that the resource which has high resource heat initially and is then not accessed for a long time cannot be evicted can be avoided, and on the other hand, the time heat factor and the resource heat obtained according to the access frequency can be maintained within a certain range, the time heat factor or the access frequency cannot be invalidated, and therefore, the time heat factor and the access frequency can both reflect importance when the resource heat is calculated.

In the embodiment, different cache periods may correspond to different preset time intervals; therefore, in the embodiment, when the S101 is executed, a time interval corresponding to the current cache period may be obtained according to a preset corresponding relationship as the preset time interval; in addition, the time intervals corresponding to different cache periods may also be the same in the embodiment.

For example, if the cache period is 10 days, the corresponding time interval may be 2 days, 5 days, or the like; if the cache period is 30 days, the corresponding time interval may be 5 days, 10 days, or the like.

In the embodiment, after the S101 is executed to acquire the access frequency of the at least one target resource, the S102 of acquiring the time heat factor corresponding to the current cache period, and acquiring resource heat of the at least one target resource according to the access frequency and the time heat factor is executed.

In the embodiment, if the current cache period is a first cache period of the corresponding storage machine, a value of the time heat factor corresponding to the current cache period is 0; if the current cache period is not the first cache period of the corresponding storage machine, the value of the time heat factor corresponding to the current cache period is an addition result between the time heat factor corresponding to the previous cache period and the preset update value.

That is, in the embodiment, the maximum resource heat in the resources which are evicted last time is not used as the time heat factor, which can avoid the problem of low calculation accuracy of the resource heat caused when the time heat factor is updated too fast or the time heat factor remains unchanged basically, thereby improving the accuracy of the acquired resource heat.

In the embodiment, during the execution of the S102 of acquiring resource heat of the target resource according to the access frequency and the time heat factor, an addition result between the access frequency corresponding to the target resource and the obtained time heat factor may be used as the resource heat of the target resource; a division result between a preset resource value (for example, 1) and a size of the target resource may be obtained as a heat parameter, and then, the resource heat of the target resource is obtained according to the time heat factor, the access frequency and the heat parameter (for example, the access frequency is multiplied by the heat parameter, and an addition result between the multiplication result and the time heat factor is used as the resource heat).

For example, if the access frequency of the target resource is 5, and the time heat factor corresponding to the current cache period is 1, in the embodiment, 6 obtained by (5+1) may be used as the resource heat of the target resource during the execution of the S102.

In the embodiment, after the S102 is executed to obtain the resource heat of the at least one target resource, a resource heat histogram may be created according to the at least one target resource and the corresponding resource heat; in the resource heat histogram created by executing the S102 in the embodiment, the horizontal axis represents a resource heat interval, and the vertical axis represents a number of resources located in the resource heat interval; absolute heat of the resource can be converted into global relative heat through the created resource heat histogram, and then, the eviction of the target resource, the update of the time heat factor, or the like, are carried out according to the resource heat histogram.

In the embodiment, after the S102 is executed to create the resource heat histogram, the resource intervals may be split and/or merged according to the number of the resources in each resource heat interval.

The split of the resource intervals includes: in the case that the number of the resources in the current resource interval is determined to be larger than or equal to a preset number threshold, the current resource interval is split into two resource intervals; and the merging of the resource intervals includes: in the case that the number of the resources in two adjacent resource intervals is determined to be smaller than the preset number threshold, the two adjacent resource intervals are merged into one resource interval.

In the embodiment, after the S102 is executed to obtain the resource heat of the at least one target resource, the S103 of acquiring target heat according to the time heat factor is executed.

In the embodiment, during the execution of the S103 of acquiring target heat according to the time heat factor, a value corresponding to the time heat factor may be directly used as the target heat; for example, if the time heat factor corresponding to the current cache period is 0, 0 is used as the target heat during the execution of the S103 in the embodiment.

However, in practical application, it is found that during the resource eviction, the target resource with the lowest resource heat is not required to be accurately evicted, and the purpose of quickly and accurately evicting the resource in the storage machine can be achieved only by evicting the resource which is not accessed again after first access; the resource heat of the resource which is not accessed again after the first access is the addition result between the time heat factor corresponding to the current cache period and the preset update value.

Therefore, in the embodiment, during the execution of the S103 of acquiring target heat according to the time heat factor, the addition result between the time heat factor and the preset update value may be used as the target heat.

For example, if the time heat factor corresponding to the current cache period is 0, and the preset update value is 1, the target heat obtained by executing the S103 in the embodiment is 1; if the time heat factor corresponding to the current cache period is 1, and the preset update value is 1, the target heat obtained by executing the S103 in the embodiment is 2.

That is, in the embodiment, the target heat is obtained according to the current time heat factor and the preset update value, such that the problem that the time heat factor is kept unchanged or changes too fast can be avoided, thereby improving the accuracy of the obtained target heat.

In the embodiment, after the S103 is executed to obtain the target heat, the S104 of evicting the target resource with the resource heat smaller than or equal to the target heat, updating the time heat factor according to a preset update value, and taking the updated time heat factor as a time heat factor corresponding to a next cache period is executed.

In the embodiment, when the S104 is executed to evict the target resource with the resource heat smaller than or equal to the target heat, the resource heat of each target resource may be compared with the target heat, so as to evict the target resource with the resource heat smaller than or equal to the target heat.

In the embodiment, when the S104 is executed to evict the target resource with the resource heat smaller than or equal to the target heat, a target heat interval corresponding to the target heat may be determined in the resource heat histogram (for example, the heat interval equal to or smaller than the target heat is used as the target heat interval), and then, the target resource located in the target heat interval is evicted.

In some practical application scenarios, the eviction of the target resource is performed based on disk blocks in the storage machine, rather than on individual resources; therefore, in the embodiment, when the S104 is executed to evict the target resource with the resource heat smaller than or equal to the target heat, the following way may be further adopted: acquiring a first resource number of target resources with the resource heat smaller than or equal to the target heat in a target disk block, the target disk block being one disk block in the storage machine or all disk blocks in the storage machine; and in the case that the acquired first resource number is determined to be larger than or equal to a first preset number threshold, evicting all the target resources in the target disk block.

That is, in the embodiment, in the scenario of evicting the target resource based on the disk block, whether all the target resources in the target disk block are evicted is determined according to the number of the target resources included in the target disk block and meeting a preset requirement, thus improving an eviction efficiency of the target resources.

After the S104 is executed to evict all the target resources in the target disk block, the method according to the embodiment may further include: acquiring the resource heat of the evicted target resource; and in the case that the acquired resource heat is determined to be greater than the target heat, rewriting the target resource into the target disk block.

That is, in the embodiment, when resource eviction is performed based on the disk block, in order to further improve the resource eviction accuracy, a recovery mechanism is additionally set to reserve the hot resource in the disk block, which avoids the problem of mistakenly evicting the hot resource in the disk block, thereby improving the resource eviction accuracy.

In the embodiment, when the S104 is executed to determine whether the resource heat of the target resource to be evicted in the disk block is greater than the target heat, query may be further performed in the established resource heat histogram according to the resource heat of the target resource to be evicted, and if the query result is that the target resource is not located within the heat interval corresponding to the target heat, the target resource is rewritten into the target disk block.

In the embodiment, after the S104 is executed to evict the target resource with the resource heat smaller than or equal to the target heat, the time heat factor may be updated according to the preset update value, and then, the updated time heat factor is used as the time heat factor corresponding to the next cache period.

Optionally, the preset update value in the embodiment is 1; that is, at each update, a value of the time heat factor is increased by 1.

It can be understood that, in the embodiment, when the S104 is executed to update the time heat factor according to the preset update value, a second resource number of the target resources with the resource heat smaller than or equal to the target heat after the eviction may be first obtained, and then, the time heat factor is updated when the obtained second resource number is determined to be smaller than a second preset number threshold; in the embodiment, when the S104 is executed, the second resource number of the target resources with the resource heat smaller than or equal to the target heat after the eviction may be obtained by querying the resource heat histogram.

That is, in practical application, there exists a scenario where all the target resources with the resource heat less than or equal to the target heat cannot be evicted; that is, after the resource eviction is completed, the target resources with the resource heat less than or equal to the target heat still exist in the storage machine, and therefore, in the embodiment, in the case that it is determined that the second resource number of the target resources with the resource heat less than or equal to the target heat remaining after the eviction is less than the second preset number threshold, the time heat factor is updated, thereby improving update accuracy of the time heat factor.

The resource eviction method according to the embodiment is exemplified as follows: the cache period is 30 days, the preset time interval is 5 days, the time heat factor corresponding to the first cache period is 0, and the preset update value is 1; after the first cache period (i.e., the first 30 days) is finished, the resource heat of each target resource in the storage machine ranges from 0 to 6, the target heat is acquired to be 1 according to the time heat factor (0) and the preset update value (1), the target resources with the resource heat less than or equal to 1 are evicted, and then, the time heat factor is updated to be 1; after the second cache period (i.e., the second 30 days) is finished, the time heat factor corresponding to the second cache period is 1, the resource heat of each target resource in the storage machine ranges from 1 to 7, the target heat is obtained to be 2 according to the time heat factor (1) and the preset update value (1), the target resources with the resource heat less than or equal to 2 are evicted, the time heat factor is updated to be 2, and the process is repeated.

Figure 2:
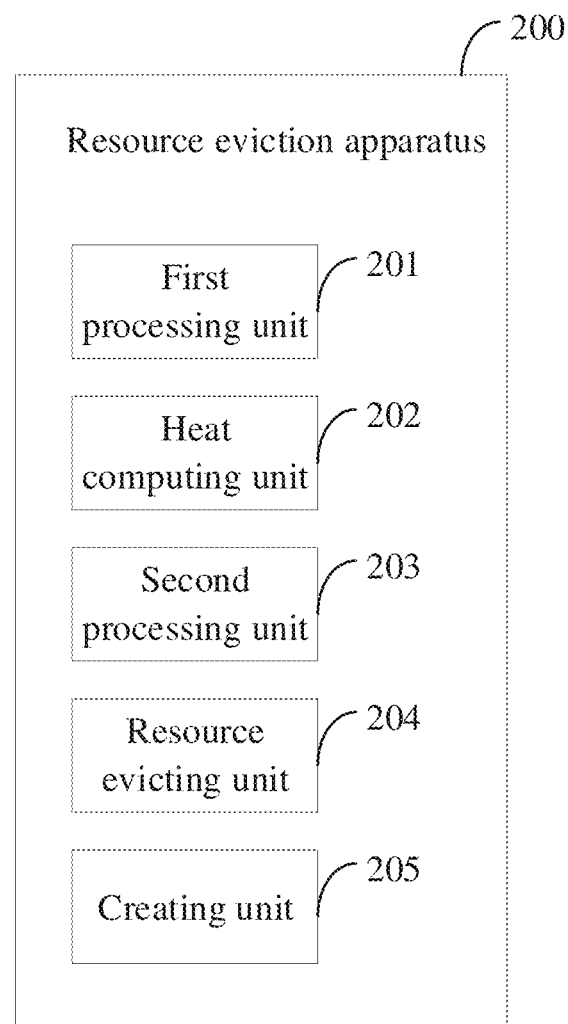
FIG. 2 is a schematic diagram according to a second embodiment of the present disclosure.

FIG. 2 is a schematic diagram according to a second embodiment of the present disclosure. As shown in FIG. 2, a resource eviction apparatus 200 according to the embodiment includes:

a first processing unit 201 configured to acquire an access day number of at least one target resource in a current cache period, and acquire an access frequency of the at least one target resource according to the access day number and a preset time interval;

a heat computing unit 202 configured to acquire a time heat factor corresponding to the current cache period, and acquire resource heat of the at least one target resource according to the access frequency and the time heat factor;

a second processing unit 203 configured to acquire target heat according to the time heat factor; and a resource evicting unit 204 configured to evict the target resource with the resource heat smaller than or equal to the target heat, update the time heat factor according to a preset update value, and take the updated time heat factor as a time heat factor corresponding to a next cache period.

In the embodiment, the target resource is stored in a storage machine, different storage machines correspond to different cache periods (for example, 10 days, 30 days, or the like), and when the cache period is reached (for example, when 10 days or 30 days are reached), the resources stored in the storage machine are evicted; the first processing unit 201 may determine the cache period according to the storage machine where the target resource is located.

The first processing unit 201 may first obtain the current cache period according to the storage machine where the target resource is located, then count days in the current cache period when the target resource is accessed, and finally obtain the access day number according to the counting result.

After acquiring the access day number of the target resource, the first processing unit 201 acquires the access frequency of the target resource according to the acquired access day number and the preset time interval; specifically, the first processing unit 201 takes a division result between the access day number and the preset time interval as the access frequency of the target resource.

That is, the first processing unit 201 sets multiple times of access to the target resource within the same day to 1 time, and then obtains the access frequency according to the access day number of the target resource within the current cache period, such that on the one hand, the problem that the resource which has high resource heat initially and is then not accessed for a long time cannot be evicted can be avoided, and on the other hand, the time heat factor and the resource heat obtained according to the access frequency can be maintained within a certain range, the time heat factor or the access frequency cannot be invalidated, and therefore, the time heat factor and the access frequency can both reflect importance when the resource heat is calculated.

In the embodiment, different cache periods may correspond to different preset time intervals; therefore, the first processing unit 201 may obtain a time interval corresponding to the current cache period according to a preset corresponding relationship as the preset time interval; in addition, the time intervals corresponding to different cache periods may also be the same in the embodiment.

In the embodiment, after the first processing unit 201 acquires the access frequency of the at least one target resource, the heat computing unit 202 acquires the time heat factor corresponding to the current cache period, and acquires the resource heat of the at least one target resource according to the access frequency and the time heat factor.

In the embodiment, if the current cache period is a first cache period of the corresponding storage machine, a value of the time heat factor corresponding to the current cache period is 0; if the current cache period is not the first cache period of the corresponding storage machine, the value of the time heat factor corresponding to the current cache period is an addition result between the time heat factor corresponding to the previous cache period and the preset update value.

That is, the heat computing unit 202 does not use the maximum resource heat in the resources which are evicted last time as the time heat factor, which can avoid the problem of low calculation accuracy of the resource heat caused when the time heat factor is updated too fast or the time heat factor remains unchanged basically, thereby improving accuracy of the acquired resource heat.

When acquiring the resource heat of the target resource according to the access frequency and the time heat factor, the heat computing unit 202 may use an addition result between the access frequency corresponding to the target resource and the obtained time heat factor as the resource heat of the target resource; may also obtain a division result between a preset resource value (for example, 1) and a size of the target resource as a heat parameter, and then obtain the resource heat of the target resource according to the time heat factor, the access frequency and the heat parameter.

The resource eviction apparatus 200 according to the embodiment may further include a creating unit 205 configured to, after the heat computing unit 202 obtains the resource heat of the at least one target resource, create a resource heat histogram according to the at least one target resource and the corresponding resource heat; in the resource heat histogram created by the creating unit 205, the horizontal axis represents a resource heat interval, and the vertical axis represents a number of resources located in the resource heat interval.

After creating the resource heat histogram, the creating unit 205 may further split and/or merge the resource intervals according to the number of the resources in each resource heat interval.

In the embodiment, after the heat computing unit 202 obtains the resource heat of the at least one target resource, the second processing unit 203 acquires the target heat according to the time heat factor.

When acquiring the target heat according to the time heat factor, the second processing unit 203 may directly use a value corresponding to the time heat factor as the target heat.

However, in practical application, it is found that during the resource eviction, the target resource with the lowest resource heat is not required to be accurately evicted, and the purpose of quickly and accurately evicting the resource in the storage machine can be achieved only by evicting the resource which is not accessed again after first access; the resource heat of the resource which is not accessed again after the first access is the addition result between the time heat factor corresponding to the current cache period and the preset update value.

Therefore, when acquiring the target heat according to the time heat factor, the second processing unit 203 may use the addition result between the time heat factor and the preset update value as the target heat.

That is, the second processing unit 203 obtains the target heat according to the current time heat factor and the preset update value, such that the problem that the time heat factor is kept unchanged or changes too fast can be avoided, thereby improving the accuracy of the obtained target heat.

In the embodiment, after the second processing unit 203 obtains the target heat, the resource evicting unit 204 evicts the target resource with the resource heat smaller than or equal to the target heat, updates the time heat factor according to the preset update value, and takes the updated time heat factor as the time heat factor corresponding to the next cache period.

When evicting the target resource with the resource heat smaller than or equal to the target heat, the resource evicting unit 204 may compare the resource heat of each target resource with the target heat, so as to evict the target resource with the resource heat smaller than or equal to the target heat.

When evicting the target resource with the resource heat smaller than or equal to the target heat, the resource evicting unit 204 may also determine a target heat interval corresponding to the target heat in the resource heat histogram, and then evict the target resource located in the target heat interval.

In some practical application scenarios, the eviction of the target resource is performed based on disk blocks in the storage machine, rather than on individual resources; therefore, when evicting the target resource with the resource heat smaller than or equal to the target heat, the resource evicting unit 204 may also adopt the following way: acquiring a first resource number of target resources with the resource heat smaller than or equal to the target heat in a target disk block; and in the case that the acquired first resource number is determined to be larger than or equal to a first preset number threshold, evicting all the target resources in the target disk block.

That is, in the scenario of evicting the target resource based on the disk block, the resource evicting unit 204 determines whether all the target resources in the target disk block are evicted according to the number of the target resources included in the target disk block and meeting a preset requirement, thus improving an eviction efficiency of the target resources.

After evicting all the target resources in the target disk block, the resource evicting unit 204 may further: acquire the resource heat of the evicted target resource; and in the case where the acquired resource heat is determined to be greater than the target heat, rewrite the target resource into the target disk block.

That is, when the resource evicting unit 204 performs resource eviction based on the disk block, in order to further improve the resource eviction accuracy, a recovery mechanism is additionally set to reserve the hot resource in the disk block, which avoids the problem of mistakenly evicting the hot resource in the disk block.

When determining whether the resource heat of the target resource to be evicted in the disk block is greater than the target heat, the resource evicting unit 204 may further perform query in the established resource heat histogram according to the resource heat of the target resource to be evicted, and if the query result is that the target resource is not located within the heat interval corresponding to the target heat, rewrite the target resource into the target disk block.

After evicting the target resource with the resource heat smaller than or equal to the target heat, the resource evicting unit 204 may update the time heat factor according to the preset update value, and then use the updated time heat factor as the time heat factor corresponding to the next cache period.

Optionally, the preset update value in the embodiment is 1; that is, at each update, a value of the time heat factor is increased by 1.

It can be understood that, when updating the time heat factor according to the preset update value, the resource evicting unit 204 may first obtain a second resource number of the target resources with the resource heat smaller than or equal to the target heat after the eviction, and then update the time heat factor when the obtained second resource number is determined to be smaller than a second preset number threshold; the resource evicting unit 204 may obtain the second resource number of the target resources with the resource heat smaller than or equal to the target heat after the eviction by querying the resource heat histogram.

That is, in practical application, there exists a scenario where all the target resources with the resource heat less than or equal to the target heat cannot be evicted; that is, after the resource eviction is completed, the target resources with the resource heat less than or equal to the target heat still exist in the storage machine, and therefore, when determining that the second resource number of the target resources with the resource heat less than or equal to the target heat remaining after the eviction is less than the second preset number threshold, the resource evicting unit 204 updates the time heat factor.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 3:
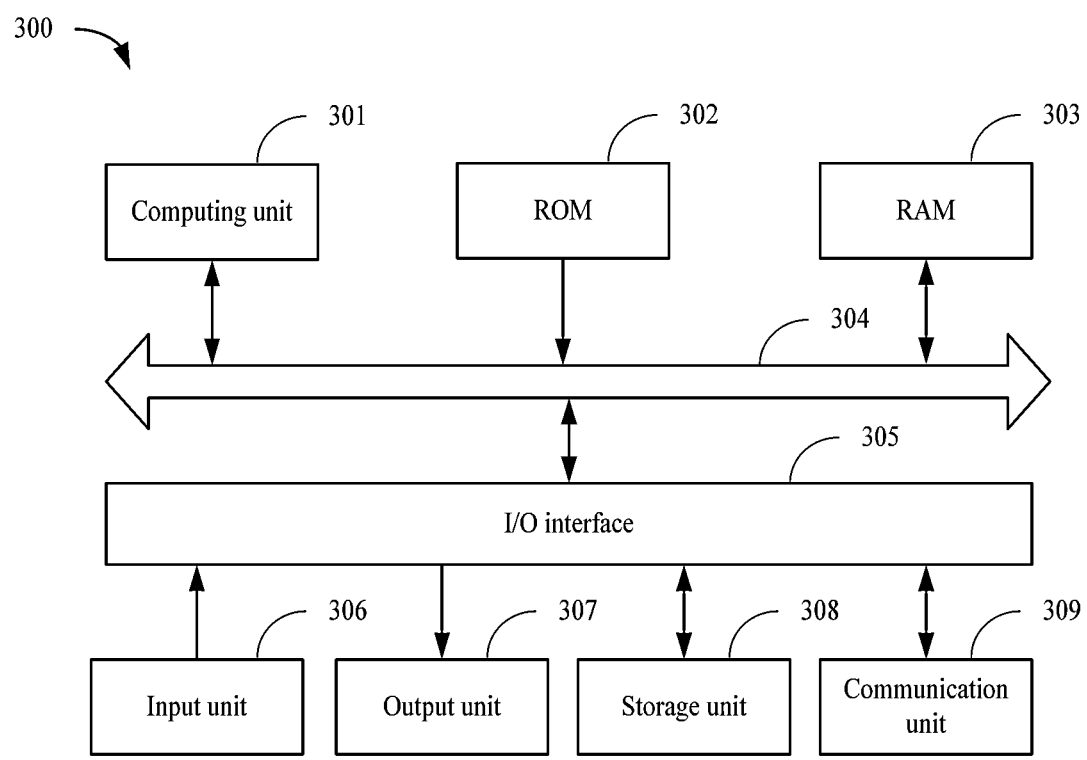
FIG. 3 is a block diagram of an electronic device configured to implement a resource eviction method according to the embodiment of the present disclosure.

FIG. 3 is a block diagram of an electronic device configured to implement a resource eviction method according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 3, the device 300 includes a computing unit 301 which may perform various appropriate actions and processing operations according to a computer program stored in a read only memory (ROM) 302 or a computer program loaded from a storage unit 308 into a random access memory (RAM) 303. Various programs and data necessary for the operation of the device 300 may be also stored in the RAM 303. The computing unit 301, the ROM 302, and the RAM 303 are connected with one other through a bus 304. An input/output (I/O) interface 305 is also connected to the bus 304.

The plural components in the device 300 are connected to the I/O interface 305, and include: an input unit 306, such as a keyboard, a mouse, or the like; an output unit 307, such as various types of displays, speakers, or the like; the storage unit 308, such as a magnetic disk, an optical disk, or the like; and a communication unit 309, such as a network card, a modem, a wireless communication transceiver, or the like. The communication unit 309 allows the device 300 to exchange information/data with other devices through a computer network, such as the Internet, and/or various telecommunication networks.

The computing unit 301 may be a variety of general and/or special purpose processing components with processing and computing capabilities. Some examples of the computing unit 301 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 301 performs the methods and processing operations described above, such as the resource eviction method. For example, in some embodiments, the resource eviction method may be implemented as a computer software program tangibly contained in a machine readable medium, such as the storage unit 308.

In some embodiments, part or all of the computer program may be loaded and/or installed into the device 300 via the ROM 302 and/or the communication unit 309. When the computer program is loaded into the RAM 303 and executed by the computing unit 301, one or more steps of the resource eviction method described above may be performed. Alternatively, in other embodiments, the computing unit 301 may be configured to perform the resource eviction method by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable resource eviction apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A resource eviction method, comprising:
   acquiring an access day number of at least one target resource in a current cache period, and acquiring an access frequency of the at least one target resource according to the access day number and a preset time interval;
   acquiring a time heat factor corresponding to the current cache period, and acquiring resource heat of the at least one target resource according to the access frequency and the time heat factor;
   acquiring target heat according to the time heat factor; and
   evicting the target resource with the resource heat smaller than or equal to the target heat, updating the time heat factor according to a preset update value, and taking the updated time heat factor as a time heat factor corresponding to a next cache period.

2. The method according to claim 1, wherein acquiring the access frequency of the at least one target resource according to the access day number and the preset time interval comprises:
   obtaining a time interval corresponding to the current cache period as the preset time interval; and
   obtaining a division result between the access day number and the time interval as the access frequency of the at least one target resource.

3. The method according to claim 1, wherein acquiring target heat according to the time heat factor comprises:
   using an addition result between the time heat factor and the preset update value as the target heat.

4. The method according to claim 1, wherein evicting the target resource with the resource heat smaller than or equal to the target heat comprises:
   acquiring a first resource number of target resources with the resource heat smaller than or equal to the target heat in a target disk block; and
   evicting all the target resources in the target disk block in the case that the first resource number is determined to be larger than or equal to a first preset number threshold.

5. The method according to claim 4, further comprising:
   after all the target resources in the target disk block are evicted, acquiring the resource heat of the evicted target resource; and
   rewriting the evicted target resource into the target disk block in the case that the acquired resource heat is determined to be greater than the target heat.

6. The method according to claim 1, wherein updating the time heat factor according to the preset update value comprises:
   acquiring a second resource number of target resources with the resource heat smaller than or equal to the target heat; and
   updating the time heat factor according to the preset update value in the case that the second resource number is determined to be smaller than a second preset number threshold.

7. The method according to claim 1, further comprising:
   after the resource heat of the at least one target resource is obtained, creating a resource heat histogram according to the at least one target resource and the corresponding resource heat;
   wherein a horizontal axis of the resource heat histogram represents a resource heat interval, and a vertical axis represents a number of target resources located in the resource heat interval.

8. The method according to claim 7, wherein evicting the target resource with the resource heat smaller than or equal to the target heat comprises:
   determining a target heat interval corresponding to the target heat in the resource heat histogram; and
   evicting the target resource located in the target heat interval.

9. An electronic device, comprising:
   at least one processor; and
   a memory connected with the at least one processor communicatively;
   wherein the memory stores instructions executable by the at least one processor to enable the at least one processor to perform a resource eviction method, comprising:
   acquiring an access day number of at least one target resource in a current cache period, and acquiring an access frequency of the at least one target resource according to the access day number and a preset time interval;
   acquiring a time heat factor corresponding to the current cache period, and acquiring resource heat of the at least one target resource according to the access frequency and the time heat factor;
   acquiring target heat according to the time heat factor; and
   evicting the target resource with the resource heat smaller than or equal to the target heat, updating the time heat factor according to a preset update value, and taking the updated time heat factor as a time heat factor corresponding to a next cache period.

10. The electronic device according to claim 9, wherein acquiring the access frequency of the at least one target resource according to the access day number and the preset time interval comprises:
    obtaining a time interval corresponding to the current cache period as the preset time interval; and
    obtaining a division result between the access day number and the time interval as the access frequency of the at least one target resource.

11. The electronic device according to claim 9, wherein acquiring target heat according to the time heat factor comprises:
    using an addition result between the time heat factor and the preset update value as the target heat.

12. The electronic device according to claim 9, wherein evicting the target resource with the resource heat smaller than or equal to the target heat comprises:
- acquiring a first resource number of target resources with the resource heat smaller than or equal to the target heat in a target disk block; and
- evicting all the target resources in the target disk block in the case that the first resource number is determined to be larger than or equal to a first preset number threshold.

13. The electronic device according to claim 12, wherein the method further comprises:
- after all the target resources in the target disk block are evicted, acquiring the resource heat of the evicted target resource; and
- rewriting the evicted target resource into the target disk block in the case that the acquired resource heat is determined to be greater than the target heat.

14. The electronic device according to claim 9, wherein updating the time heat factor according to the preset update value comprises:
- acquiring a second resource number of target resources with the resource heat smaller than or equal to the target heat; and
- updating the time heat factor according to the preset update value when the second resource number is determined to be smaller than a second preset number threshold.

15. The electronic device according to claim 9, wherein the method further comprises:
- after the resource heat of the at least one target resource is obtained, creating a resource heat histogram according to the at least one target resource and the corresponding resource heat;
- a horizontal axis of the resource heat histogram represents a resource heat interval, and a vertical axis represents a number of target resources located in the resource heat interval.

16. The electronic device according to claim 15, wherein evicting the target resource with the resource heat smaller than or equal to the target heat comprises:
- determining a target heat interval corresponding to the target heat in the resource heat histogram; and
- evicting the target resource located in the target heat interval.

17. A non-transitory computer readable storage medium with computer instructions stored thereon, wherein the computer instructions are used for causing a computer to perform a resource eviction method, comprising:
- acquiring an access day number of at least one target resource in a current cache period, and acquiring an access frequency of the at least one target resource according to the access day number and a preset time interval;
- acquiring a time heat factor corresponding to the current cache period, and acquiring resource heat of the at least one target resource according to the access frequency and the time heat factor;
- acquiring target heat according to the time heat factor; and
- evicting the target resource with the resource heat smaller than or equal to the target heat, updating the time heat factor according to a preset update value, and taking the updated time heat factor as a time heat factor corresponding to a next cache period.

18. The non-transitory computer readable storage medium according to claim 17, wherein acquiring the access frequency of the at least one target resource according to the access day number and the preset time interval comprises:
- obtaining a time interval corresponding to the current cache period as the preset time interval; and
- obtaining a division result between the access day number and the time interval as the access frequency of the at least one target resource.

19. The non-transitory computer readable storage medium according to claim 17, wherein the acquiring target heat according to the time heat factor comprises:
- using an addition result between the time heat factor and the preset update value as the target heat.

20. The non-transitory computer readable storage medium according to claim 17, wherein evicting the target resource with the resource heat smaller than or equal to the target heat comprises:
- acquiring a first resource number of target resources with the resource heat smaller than or equal to the target heat in a target disk block; and
- evicting all the target resources in the target disk block in the case that the first resource number is determined to be larger than or equal to a first preset number threshold.

* * * * *